United States Patent
Bhushan et al.

(10) Patent No.: US 9,794,792 B2
(45) Date of Patent: Oct. 17, 2017

(54) SHARED SPECTRUM OPERATION

(71) Applicant: QUALCOMM Incorporated, San Diego, CA (US)

(72) Inventors: Naga Bhushan, San Diego, CA (US); John Edward Smee, San Diego, CA (US); Tingfang Ji, San Diego, CA (US); Ahmed Kamel Sadek, San Diego, CA (US); Krishna Kiran Mukkavilli, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/853,294

(22) Filed: Sep. 14, 2015

(65) Prior Publication Data
US 2016/0094998 A1    Mar. 31, 2016

Related U.S. Application Data

(60) Provisional application No. 62/056,266, filed on Sep. 26, 2014.

(51) Int. Cl.
*H04W 16/14* (2009.01)
*H04W 24/08* (2009.01)
(Continued)

(52) U.S. Cl.
CPC .......... *H04W 16/14* (2013.01); *H04W 24/08* (2013.01); *H04W 74/0808* (2013.01); *H04W 84/042* (2013.01)

(58) Field of Classification Search
CPC ............. H04W 88/06; H04W 72/0493; H04W 72/005; H04W 72/04; H04W 72/0453;
(Continued)

(56) References Cited

U.S. PATENT DOCUMENTS 7,376,425 B2    5/2008   Laroia et al.
9,084,276 B2    7/2015   Grabowsky et al.
(Continued)

FOREIGN PATENT DOCUMENTS

EP       2094052 A2        8/2009
WO   WO-2013119095 A1     8/2013
WO   WO-2014117135 A2     7/2014

OTHER PUBLICATIONS

Alcatel-Lucent., et al., "Review of Regulatory Requirements for Unlicensed spectrum", 3GPP Draft; RWS-140015 Unlicensed Spectrum Summary, 3rd Generation Partnership Project (3GPP), Mobile Competence Centre ; 650, Route Des Lucioles ; F-06921 Sophia-Antipolis Cedex ; France No. Shanghai; Jun. 13, 2014 , XP050774762, 12 Pages. Retrieved from the Internet: URL:http://www.3gpp.org/ftp/Meetings_3GPP_SYNC/2014-06-13_LTE-U/Docs/ [retrieved on Jun. 6, 2014].
(Continued)

*Primary Examiner* — Temica M Beamer
*Assistant Examiner* — Gary Lafontant
(74) *Attorney, Agent, or Firm* — Liem T. Do

(57) ABSTRACT

Shared spectrum operation is disclosed for sharing spectrum among multiple wireless deployments. Coordination procedures between and among $2^{nd}$ and $3^{rd}$ Tier deployments include the use of beacons transmitted by the $2^{nd}$ Tier for clearing access to spectrum occupied by $3^{rd}$ Tier users and multiple $3^{rd}$ Tier deployments sharing resources using a group-listen before talk (LBT) protocol, rather than a per-node LBT protocol. The $2^{nd}$ Tier beacon signals are transmitted to alert $3^{rd}$ Tier users of their presence, which, upon detection, will leave the particular spectrum within a predetermined time. For the shared LBT protocol, the $3^{rd}$ Tier deployments share the channel with each other through an LBT with random backoff, in which the start time of clear
(Continued)

channel assessment (CCA) procedure and the random back-off values are synchronized among nodes of the same deployment.

24 Claims, 6 Drawing Sheets

(51) Int. Cl.
*H04W 74/08* (2009.01)
*H04W 84/04* (2009.01)

(58) Field of Classification Search
CPC ..... H04W 16/18; H04W 24/02; H04W 28/18; H04H 20/67; H04H 20/42; H04H 20/72; H04H 20/57; H04B 10/50; H04B 7/06; H04B 7/155
See application file for complete search history.

(56) References Cited

U.S. PATENT DOCUMENTS

| | | |
|---|---|---|
| 2008/0159208 A1 | 7/2008 | Kloker et al. |
| 2008/0298310 A1 | 12/2008 | Hu |
| 2009/0180453 A1 | 7/2009 | Hu |
| 2010/0135226 A1 | 6/2010 | Chandramouli et al. |
| 2012/0270519 A1 | 10/2012 | Ngai et al. |
| 2013/0156016 A1 | 6/2013 | Debnath et al. |
| 2013/0322371 A1 | 12/2013 | Prakash et al. |
| 2014/0080535 A1 | 3/2014 | Gauvreau et al. |
| 2014/0179252 A1* | 6/2014 | Takagi ................. H04B 7/0805 455/226.2 |
| 2016/0094997 A1* | 3/2016 | Bhushan ........... H04W 74/0808 455/454 |

OTHER PUBLICATIONS

International Search Report and Written Opinion—PCT/US2015/050201—ISA/EPO—Dec. 3, 2015.
Nokia Corporation., et al., "Channel Access Mechanisms according to ETSI regulations", 3GPP Draft; R1-144183, 3rd Generation Partnership Project (3GPP), Mobile Competence Centre; 650, Route Deslucioles; F-06921 Sophia-Antipolis Cedex; France vol. Ran WG1, No. Ljubljana, Slovenia; 20141006-20141010, Sep. 27, 2014 (Sep. 27, 2014), XP050869827, Retrieved from the Internet URL: http://www.3gpp.org/ftp/tsg_ran/WG1_RL1/TSGR1_78b/Docs/ [retrieved on Sep. 27, 2014].
Paisana F., et al., "Radar, TV and Cellular Bands: Which Spectrum Access Techniques for Which Bands?," IEEE Communications Surveys & Tutorials, Third Quarter 2014, vol. 16 (3), pp. 1193-1220, XP011557068, DOI: 10.1109/SURV.2014.031914.00078.

* cited by examiner

SHARED SPECTRUM OPERATION

CROSS-REFERENCE TO RELATED APPLICATIONS

This application claims the benefit of U.S. Provisional Patent Application No. 62/056,266, entitled, "SHARED SPECTRUM OPERATION," filed on Sep. 26, 2014, which is expressly incorporated by reference herein in its entirety.

BACKGROUND

Field

Aspects of the present disclosure relate generally to wireless communication systems, and more particularly, to shared spectrum operation among multiple tiers of users.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes detecting, by a second tier transmitter, data for transmission over a shared spectrum, transmitting, by the second tier transmitter, a second tier beacon over at least one channel in the shared spectrum, wherein the second tier beacon identifies that the second tier transmitter is a second tier node, and transmitting, by the second tier transmitter, after expiration of a predefined idle period after transmitting the second tier beacon, the data over the at least one channel in the shared spectrum.

In an additional aspect of the disclosure, a method of wireless communication includes obtaining, by a third tier transmitter, synchronization timing, wherein the synchronization timing synchronizes the third tier transmitter to a second tier infrastructure, switching, by the third tier transmitter, to a transmitter silence mode during a beacon slot on a shared spectrum, wherein the third tier transmitter determines the beacon slot using the synchronization timing, in response to detecting a second tier beacon during the beacon slot, ceasing, by the third tier transmitter within a predefined period, transmission of data on a channel of the shared spectrum on which the second tier beacon is detected.

In an additional aspect of the disclosure, a method of wireless communication includes determining, by a third tier node, whether the third tier node has accessed a channel of a shared spectrum within a predetermined maximum idle time, randomly selecting, by the third tier node, a wait number from a predefined set of wait numbers in response to the third tier node detecting access to the channel within the predetermined maximum idle time, conducting, by the third tier node, a clear channel assessment (CCA) check of the channel after waiting a number of slots equal to the randomly selected wait number, and transmitting, by the third tier node, data on the channel in response to the CCA check being clear.

In an additional aspect of the disclosure, an apparatus configured for wireless communication includes means for detecting, by a second tier transmitter, data for transmission over a shared spectrum, means for transmitting, by the second tier transmitter, a second tier beacon over at least one channel in the shared spectrum, wherein the second tier beacon identifies that the second tier transmitter is a second tier node, and means for transmitting, by the second tier transmitter, after expiration of a predefined idle period after transmitting the second tier beacon, the data over the at least one channel in the shared spectrum.

In an additional aspect of the disclosure, an apparatus configured for wireless communication includes means for obtaining, by a third tier transmitter, synchronization timing, wherein the synchronization timing synchronizes the third tier transmitter to a second tier infrastructure, means for switching, by the third tier transmitter, to a transmitter silence mode during a beacon slot on a shared spectrum, wherein the third tier transmitter determines the beacon slot using the synchronization timing, means, executable in response to detecting a second tier beacon during the beacon slot, for ceasing, by the third tier transmitter within a predefined period, transmission of data on a channel of the shared spectrum on which the second tier beacon is detected.

In an additional aspect of the disclosure, an apparatus configured for wireless communication includes means for determining, by a third tier node, whether the third tier node has accessed a channel of a shared spectrum within a predetermined maximum idle time, means for randomly selecting, by the third tier node, a wait number from a predefined set of wait numbers in response to the third tier node detecting access to the channel within the predetermined maximum idle time, means for conducting, by the third tier node, a CCA check of the channel after waiting a number of slots equal to the randomly selected wait number, and means for transmitting, by the third tier node, data on the channel in response to the CCA check being clear.

In an additional aspect of the disclosure, a computer-readable medium having program code recorded thereon. This program code includes code to detect, by a second tier transmitter, data for transmission over a shared spectrum, code to transmit, by the second tier transmitter, a second tier beacon over at least one channel in the shared spectrum, wherein the second tier beacon identifies that the second tier transmitter is a second tier node, and code to transmit, by the second tier transmitter, after expiration of a predefined idle period after transmitting the second tier beacon, the data over the at least one channel in the shared spectrum.

In an additional aspect of the disclosure, a computer-readable medium having program code recorded thereon. This program code includes code to obtain, by a third tier transmitter, synchronization timing, wherein the synchronization timing synchronizes the third tier transmitter to a second tier infrastructure, code to switch, by the third tier transmitter, to a transmitter silence mode during a beacon slot on a shared spectrum, wherein the third tier transmitter determines the beacon slot using the synchronization timing, code, executable in response to detecting a second tier beacon during the beacon slot, to cease, by the third tier transmitter within a predefined period, transmission of data on a channel of the shared spectrum on which the second tier beacon is detected.

In an additional aspect of the disclosure, a computer-readable medium having program code recorded thereon. This program code includes code to determine, by a third tier node, whether the third tier node has accessed a channel of a shared spectrum within a predetermined maximum idle time, code to randomly select, by the third tier node, a wait number from a predefined set of wait numbers in response to the third tier node detecting access to the channel within the predetermined maximum idle time, code to conduct, by the third tier node, a CCA check of the channel after waiting a number of slots equal to the randomly selected wait number, and code to transmit, by the third tier node, data on the channel in response to the CCA check being clear.

In an additional aspect of the disclosure, an apparatus includes at least one processor and a memory coupled to the processor. The processor is configured to detect, by a second tier transmitter, data for transmission over a shared spectrum, to transmit, by the second tier transmitter, a second tier beacon over at least one channel in the shared spectrum, wherein the second tier beacon identifies that the second tier transmitter is a second tier node, and to transmit, by the second tier transmitter, after expiration of a predefined idle period after transmitting the second tier beacon, the data over the at least one channel in the shared spectrum.

In an additional aspect of the disclosure, an apparatus includes at least one processor and a memory coupled to the processor. The processor is configured to obtain, by a third tier transmitter, synchronization timing, wherein the synchronization timing synchronizes the third tier transmitter to a second tier infrastructure, to switch, by the third tier transmitter, to a transmitter silence mode during a beacon slot on a shared spectrum, wherein the third tier transmitter determines the beacon slot using the synchronization timing, to cease, in response to detecting a second tier beacon during the beacon slot, by the third tier transmitter within a predefined period, transmission of data on a channel of the shared spectrum on which the second tier beacon is detected.

In an additional aspect of the disclosure, an apparatus includes at least one processor and a memory coupled to the processor. The processor is configured to determine, by a third tier node, whether the third tier node has accessed a channel of a shared spectrum within a predetermined maximum idle time, to randomly select, by the third tier node, a wait number from a predefined set of wait numbers in response to the third tier node detecting access to the channel within the predetermined maximum idle time, to conduct, by the third tier node, a CCA check of the channel after waiting a number of slots equal to the randomly selected wait number, and to transmit, by the third tier node, data on the channel in response to the CCA check being clear.

DETAILED DESCRIPTION

Figure 1:
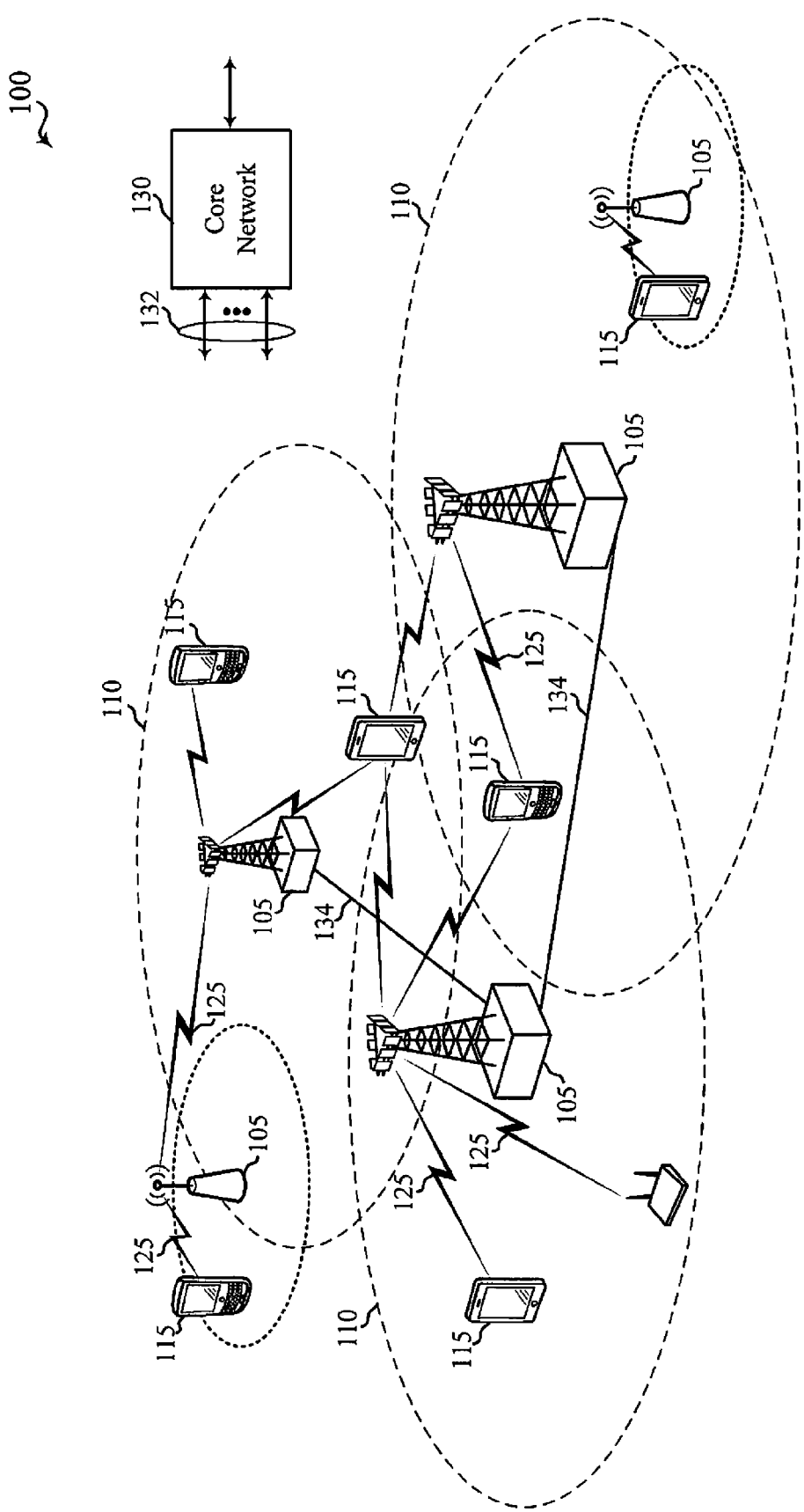
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
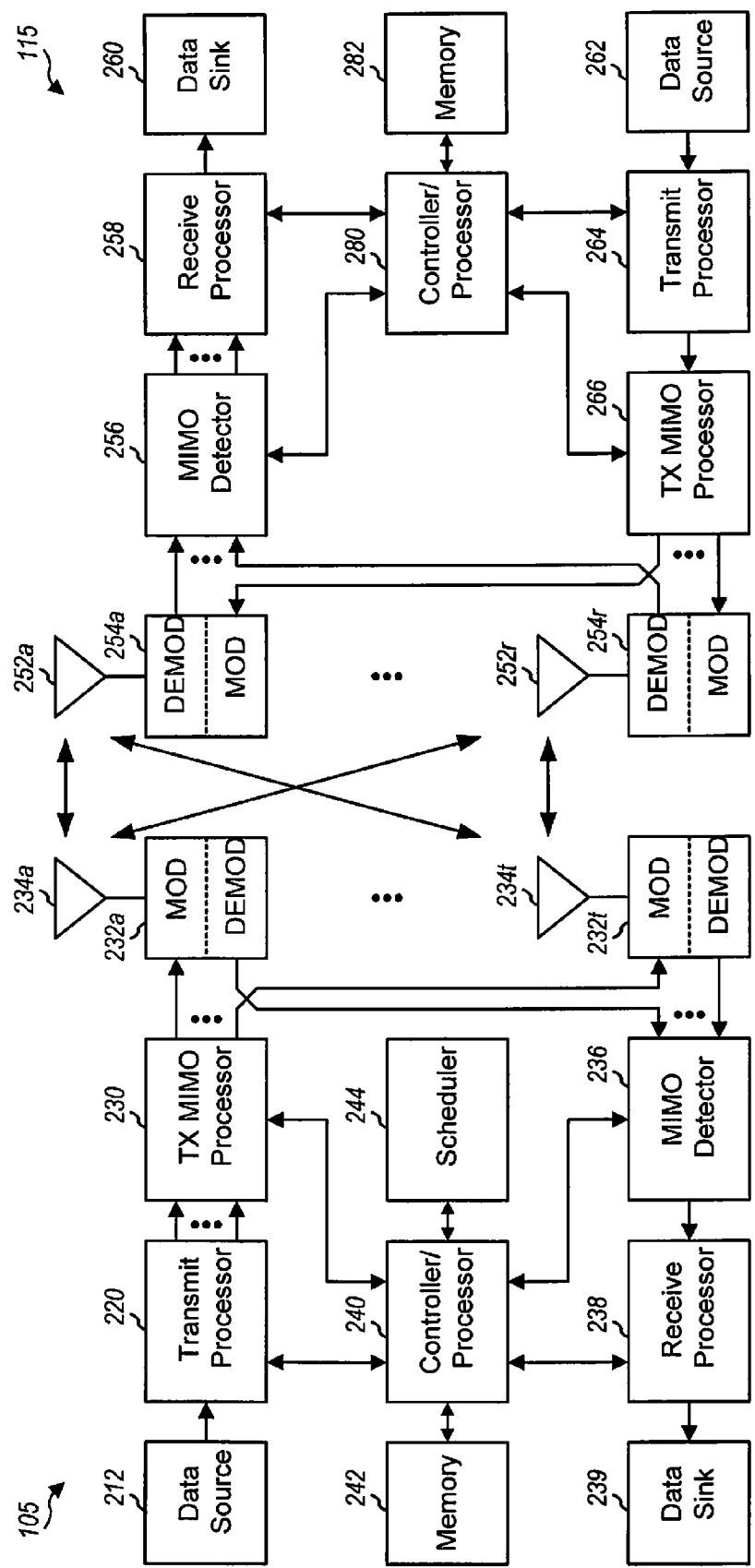
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5-7, and/or other processes for the techniques described herein. The memories 242 and 282 may store data and program codes for the eNB 110 and the UE 120, respectively. A scheduler 244 may schedule UEs for data transmission on the downlink and/or uplink.

Figure 3:
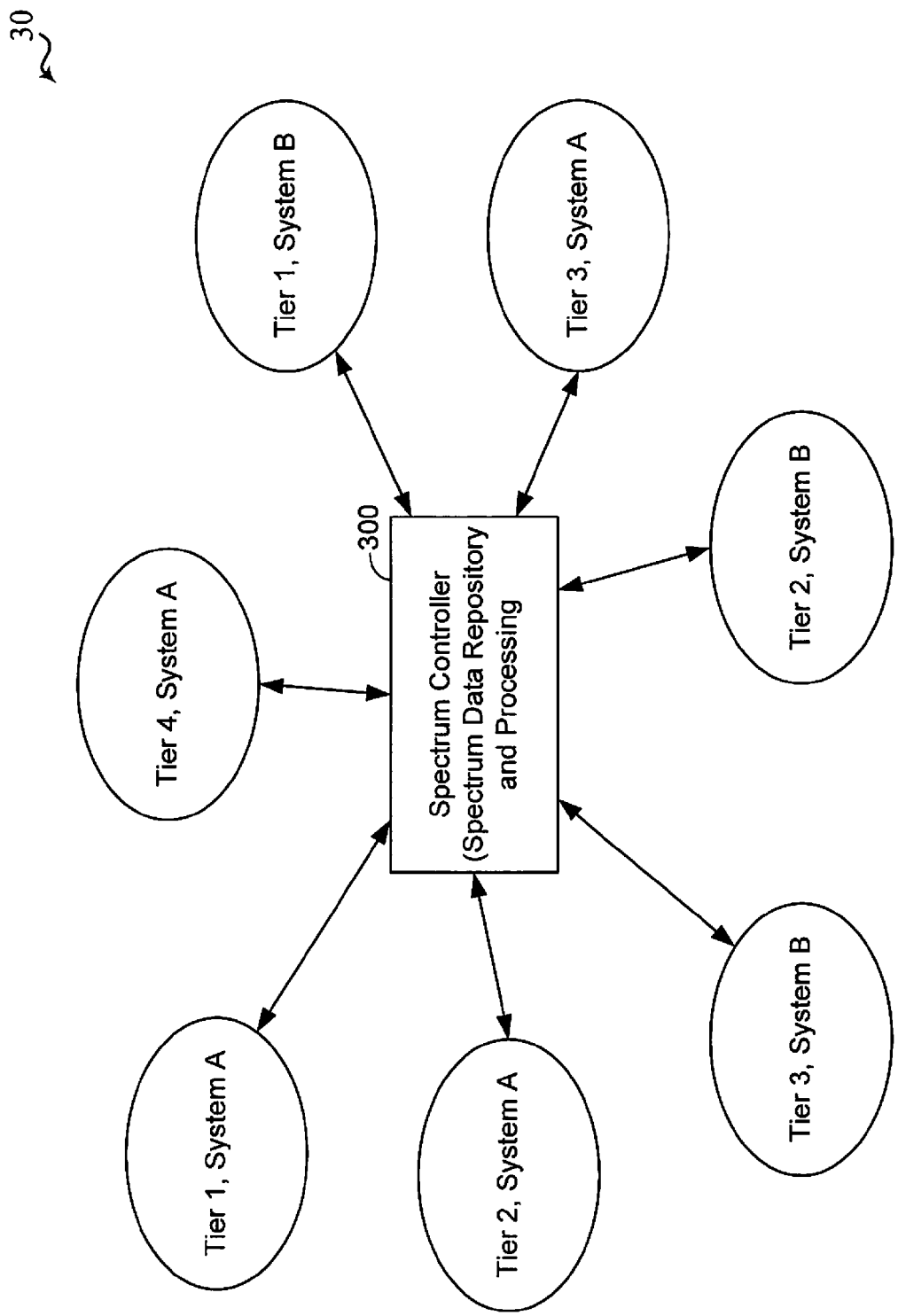
FIG. 3 illustrates a block diagram illustrating a multi-tiered communication system.

FIG. 3 illustrates a block diagram illustrating a multi-tiered communication system. As shown in FIG. 3, multi-tiered system 30 may have multiple tiers 1-4. Each tier may be specified for particular systems, such as incumbent systems, general access systems, and/or priority access systems. In one configuration, a spectrum controller 300 may receive information from a higher level tier indicating unused spectrum. Spectrum controller 300 may then inform a lower level tier of available spectrum based on the indicated unused spectrum.

For example, system A of Tier 1 may report its unused spectrum to spectrum controller 300. Furthermore, in the present example, based on the unused spectrum of system A of Tier 1, spectrum controller 300 may notify the systems, such as system A and system B, of Tier 2 of the available spectrum. Moreover, the systems of the Tier 2 may report the unused spectrum available from Tier 1 to spectrum controller 300, and spectrum controller 300 may then notify the systems A and B of Tier 3 of the available spectrum based on the unused spectrum of Tier 1 and Tier 2. Finally, the systems A and B of Tier 3 may report their unused spectrum available from Tier 2 to spectrum controller 300, and spectrum controller 300 may then notify system A of Tier 4 of the available spectrum based on the unused spectrum of Tier 3, Tier 2, and Tier 1. Although each tier is described as managed separately, multiple licensees within a tier can be managed by one entity, while other licensees can be managed by another entity. For example, there can be fixed boundaries on resources allocated to each system, or some other management approach.

As suggested above, the available wireless spectrum usable for wireless communication may be shared in multiple ways. Vertical sharing is sharing of the spectrum between users having a different priority access to the spectrum. For example, vertical sharing may occur between a first tier user or incumbent and a second tier or priority license holder. A first tier user or incumbent may be the primary spectrum user, such as a governmental entity, agency, branch of military, a public system, satellite communication system, television station, or the like. The first tier user or incumbent may not use the spectrum at all times, on nationwide basis, or in its entirety. In that case, the regulatory authority may license one or more entities to use the spectrum when and where it is not used by the first tier or incumbent user. The second tier or priority license holder may be such a primary licensee of the spectrum from the first tier user. A second tier user may include commercial communication service providers, operators, or the like. Vertical sharing may also occur between second tier and third tier or general license holders. The third tier users would include users with licenses that have a lower priority to the second tier users, such as wireless internet service providers (WISPs). In vertical sharing, there are no common customers between the first tier, second tier, and third tier users.

Spectrum may also be shared horizontally. In horizontal sharing, spectrum is shared between competing systems within the same tier. For example, horizontal sharing may occur between multiple first tier users, between multiple second tier users, or between multiple third tier users. In general, first tier or incumbent user may employ unmodified/legacy technology, while second and third tier users may employ technologies that adhere to various spectrum-specific sharing/coexistence procedures. Sharing between first tier and other tier users may be based on database lookup where the other tier users may look up available spectrum access times, locations, or the like. Sharing between first tier and other tier users may also be based on sensing. For example, radar operators typically have first tier access to shared spectrum. Prior to transmitting on the shared spectrum, second or third tier users may first detect whether radar pulses may be resident on the portion of the spectrum intended for second or third tier user access. Second and third tier users will vacate the spectrum whenever a first tier user is detected on the spectrum.

With vertical sharing between second and third tier users, the second tier infrastructure may be time-synchronized based on timing signals detected from the global navigation satellite system (GNSS). According to aspects of the present disclosure, second tier users may transmit beacons at known intervals (e.g., once every T msec), whenever the user intends to be active on a given channel. Once the second tier user transmits the beacon, it expects the channel to be free of any third tier users within x msec of the beacon transmission and for a period of at least y msec. Before operating on a given channel, third tier users may acquire timing from a reliable source (e.g., GNSS) and then monitor the channel for at least N beacon slots, where N·T>y. If the second tier user fails to detect a beacon on any of the slots, the third tier users may operate on the given channel.

While using the channel, third tier users may silence transmissions during each of the beacon slots at the T intervals in order to listen for the second tier beacons. If the third tier users detect a second tier beacon, third tier infrastructure ensures that the current third tier connections are terminated or switched-over to another available channel within x msec.

Aspects of the present disclosure provide for wideband second tier beacon signals that may span the entire spectrum occupied by a particular second tier deployment. The wideband beacon across the spectrum provides frequency diversity in order to reduce the effects of fading. Aspects of the present disclosure also provide for second tier infrastructure nodes (e.g., eNB, AP, transmitters, and the like) may transmit the beacon signal over the same time slots by transmitting the beacons on the same set of tones, on disjoint sets of tones (one tone-set per node) within the time slot, or the like.

Figure 4:
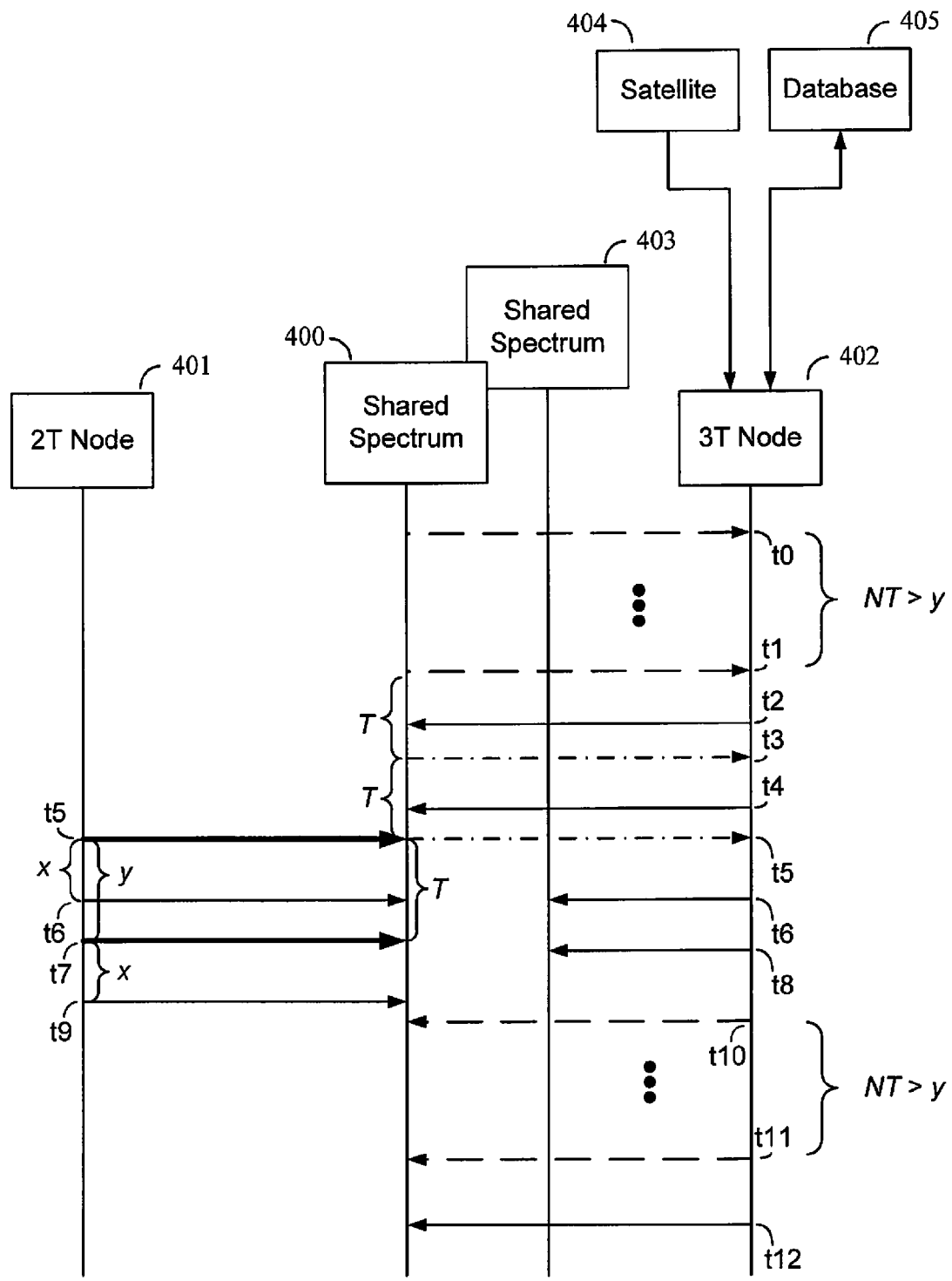
FIG. 4 is a block diagram illustrating vertical sharing of shared spectrum between a second tier node and a third tier node.

FIG. 4 is a block diagram illustrating vertical sharing of shared spectrum 400 and 403 between a second tier node 401 and a third tier node 402 configured according to one aspect of the present disclosure. Second tier node 401 and third tier node 402 share communication spectrum as illustrated by shared spectrum 400 and 403. Third tier node 402 may obtain synchronization to the second tier infrastructure, of which second tier node 401 is part, by obtaining synchronization timing from various sources, such as satellite 404. Using the synchronized timing, third tier node 402 may determine the frequency at which second tier node 401 transmits second tier beacons.

This information with respect to the transmission periodicity and slot of the second tier beacons may be known to third tier node 402, such as through standards provisions, or it may be obtained by third tier node 402 directly, such as through database 405. With the synchronization timing and knowledge of the beacon slot and periodicity, third tier node 402 begins monitoring the known beacon slots for second tier beacons. Second tier node 401, when it desires to access shared spectrum 400 to transmit data, will begin to transmit second tier beacons at a time/interval, T. In order to provide opportunity to detect such second tier beacons, third tier node 402 monitors shared spectrum 400 for at a predefined number of beacon slots, N. As illustrated, third tier node 402 monitors shared spectrum 400 from time, t0, until time, t1. This time period between times t0 and t1 is at least larger than the total time, y, that second tier node 401 would expect shared spectrum 400 to be clear once it transmits a second tier beacon. The time period between times t0 and t1 is determined by NT>y.

Over the monitoring period between t0 and t1, third tier node 402 does not detect any second tier beacons in the monitored beacon slots. As such, after successfully completing a CCA check, third tier node 402 begins transmitting data at time, t2, over shared spectrum 400. As transmission starts by third tier node 402, after an interval, T, from t1, third tier node 402, at time, t3, enters a silence period. The interval, T, corresponds to the periodicity of second tier beacon signals that would be transmitted by a second tier node, such as second tier node 401. The silence period at t3 ensures that there would be no interference with a second tier beacon from third tier node 402 and allows third tier node 402 to again monitor for a second tier beacon.

After detecting no second tier beacon during the silence period at t3, third tier node 402 again begins transmission at time, t4. At time, t5, second tier node 401 determines that it has data to transmit and, thus, transmits a second tier beacon over shared spectrum 400. With the passing of interval, T, third tier node 402 again enters a silence period to monitor for beacons. At time, t5, third tier node 402 detects such a second tier beacon from second tier node 401. Once a second tier beacon has been detected, third tier node 402 begins the process to switch transmission from shared spectrum 400 to shared spectrum 403, which is currently available for third tier transmissions. Third tier node 402 has a duration of time, x, in which to switch transmission off of shared spectrum 400 to shared spectrum 403. After duration, x, second tier node 401 will begin transmitting on shared spectrum 400 and presume that shared spectrum 400 will be available for at least time, y.

During this time, third tier node 402 has switched communications to shared spectrum 403 and has transmitted data at times, t6 and t8, on shared spectrum 403. Second tier node 401 has also transmitted data on shared spectrum 400 at times, t6 and t9. After the time, y, and interval, T, second tier node 401 will transmit another second tier beacon, at time, t7. The second transmission of data by second tier node 401 at time, t9, begins a time, x, from the second transmission of the second tier beacon at time, t7. Accordingly, second tier node maintains the interval of second tier beacons and maintains the transmission relationship that shared spectrum 400 will be available for transmission at a time, x, from transmitting the second tier beacon, and will remain available for transmission for at least a time of y. After the transmission at time, t9, second tier node 401 no longer had data for transmission and, thus, ceases transmission of the second tier beacon.

Third tier node 402 may again begin a detection process between times, t10 and t11, that may be defined by NT>y. Thus, after not detecting any additional second tier beacons between times, t10 and t11, third tier node 402 may again transmit on shared spectrum 400 with the data transmission at time, t12. The vertical sharing process between second tier node 401 and third tier node 402 allows for shared spectrum 400 to be available to the higher priority of second tier node 401 within x time of transmitting the second tier beacon.

The second tier beacons at times, t5 and t7, are recognized by third tier node 402 as a second tier beacon. The beacon may not contain any identifying information that would indicate to third tier node 402 the specific ID of second tier node 401. Third tier node 402 simply recognizes that a higher-priority node access is about to begin transmissions on shared spectrum 400 and third tier node 402 now has time, x, in order to cease transmission on shared spectrum 400 or switch to a different channel, such as switching to shared spectrum 403.

In additional aspects of the present disclosure, multiple base stations of the same deployment may transmit the same waveform. In such aspects, the beacons would not include any node-specific content. However, the beacons may be transmitted with the system frame number (SFN) of the particular deployment for better coverage and diversity of the beacon signal, especially in interference-limited deployments.

Alternative aspects of the present disclosure may provide for second tier deployments to be partitioned into multiple sub-deployments with SFN transmission of the beacon within each sub-deployment. For example, in Heterogeneous networks, macro nodes may be one sub-deployment while pico or femto nodes are considered other sub-deployments. The beacon signal from each such sub-deployment may carry sub-deployment specific payload. In additional aspects of the present disclosure, each second tier node may represent a distinct sub-deployment.

Figures 5, 6:
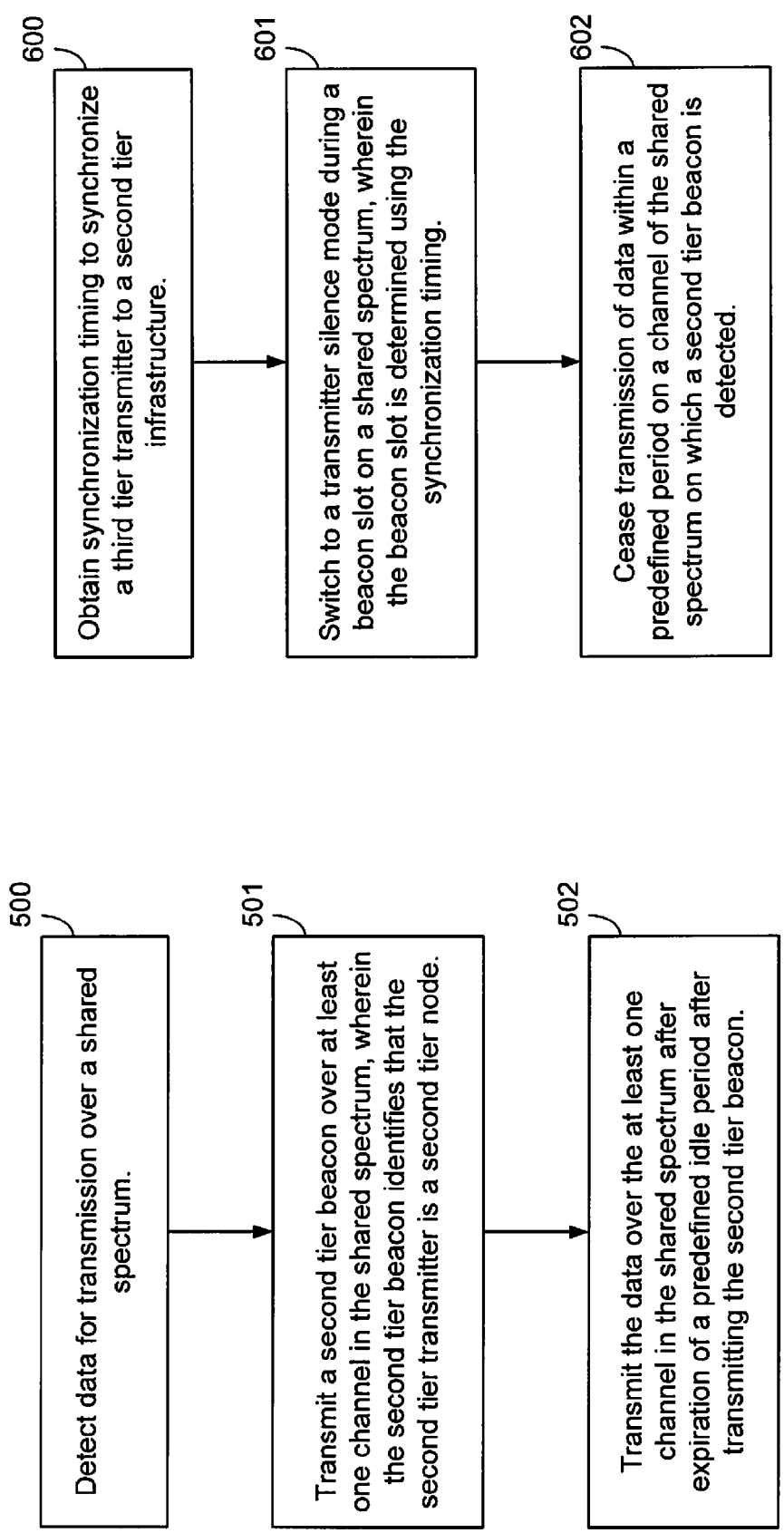
FIGS. 5-7 are functional block diagrams illustrating example blocks executed to implement one aspect of the present disclosure.

FIG. 5 is a functional block diagram illustrating example blocks executed to implement one aspect of the present disclosure. At block 500, a second tier transmitter detects data for transmission over a shared spectrum. With data to transmit, the second tier transmitter, at block 501, transmits a second tier beacon over at least one channel in the shared spectrum that it desires to transmit the data. The second tier beacon identifies that the second tier transmitter is a second tier node that is part of the second tier infrastructure. At block 502, the second tier transmitter transmits the data over the channel after expiration of a predefined idle period after transmitting the second tier beacon. The second tier transmitter expects that the shared spectrum will be available at a certain time after sending the beacon. This predefined idle period is the time that the second tier transmitter will wait to begin data transmissions after transmitting the second tier beacon.

FIG. 6 is a functional block diagram illustrating example blocks executed to implement one aspect of the present disclosure. At block 600, a third tier transmitter obtains synchronization timing to synchronize the third tier transmitter to a second tier infrastructure. The third tier transmitter may obtain this synchronization information from a reliable timing source, such as GNSS, and/or it may obtain synchronization and beacon transmission information from a database of access information to the shared spectrum.

At block 601, the third tier transmitter switches to a transmitter silence mode during a beacon slot, in which the transmitter of the third tier transmitter is completely silent. The beacon slot is determined by the third tier transmitter using the synchronization timing. During the transmitter silence mode, the third tier transmitter may monitor for a second tier beacon signal transmission. At block 602, when such a beacon signal is detected, the third tier transmitter will cease transmission of data within a predefined period on the channel that the beacon was detected. Because a second tier node will begin transmission with the predefined period after transmitting the beacon, the third tier transmitter will cease its transmissions on the shared spectrum within that same time period. The third tier transmitter will either simply terminate the transmission or switch the transmission to another available resource.

Figure 7:
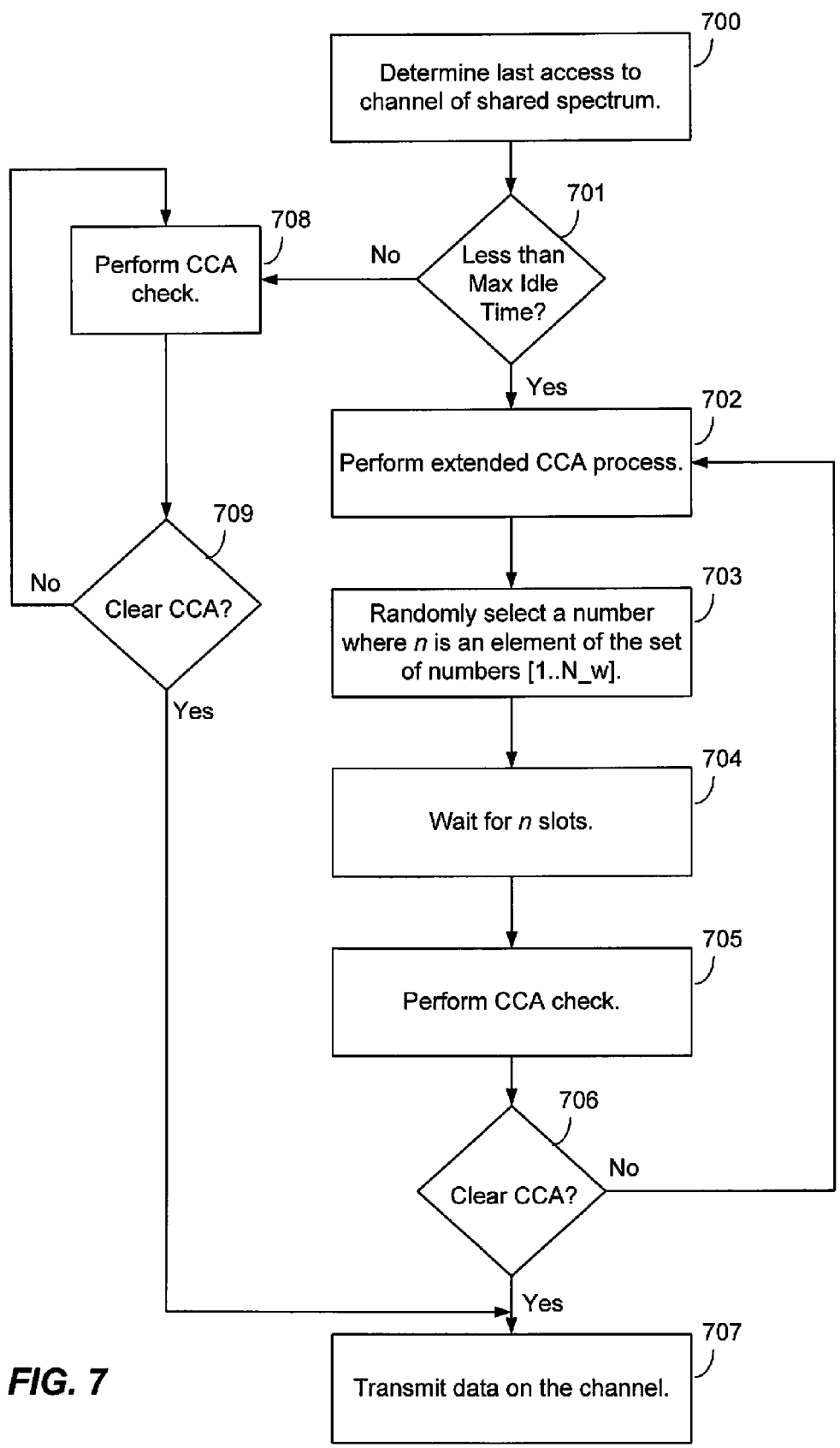

It should be noted that the second tier beacon may be designed for robust demodulation with coarse time-frequency tracking at the receiver, and at low signal-to-noise ratio (SNR) conditions. Additionally, interference to such second tier beacon signals may be reduced or eliminated by requiring third tier deployments to silence their transmission over time-intervals dedicated for beacon transmissions. The time intervals and configurations of beacon signals for each channel may be listed in a database that may also contain first tier usage information. Thus, when a third tier user wants to access shared spectrum, it may first access the database to determine how and when the third tier user can access the shared spectrum and may also include the second tier beacon interval Additional aspects of the present disclosure are directed to horizontal sharing of the shared spectrum by third tier nodes. FIG. 7 is a functional block diagram illustrating example blocks executed to implement one aspect of the present disclosure. At block 700, a determination is made by a third tier node when it last accessed the channel of the shared spectrum. Accessing the channel may include either transmitting or receiving data over the channel. At block 701, a determination is made whether the last access of the channel by the third tier node is less than a predetermined maximum idle time. For example, the predetermined maximum idle time may be approximately 20-30 μsec.

If the third tier node has accessed the channel within the predetermined maximum idle time, then, at block 702, the third tier node performs an extended clear channel assessment (CCA) process. The extended CCA process begins, at block 703, by the third tier node randomly selecting or generating a number, $n \in [1 \ldots N\_w]$. The random number generator used for randomly selecting the number may be the same random number generator for every third tier node within the same third tier deployment, keyed by the start time of the CCA check. Different third tier nodes that are a part of different deployments may use random number generators that are not correlated with the other deployments.

The purpose of using random number generator seeded by the deployment identifier (ID) and CCA start time is to enable maximal spatial reuse of the channel among nodes of the same deployment. Links of a given deployment are typically based on the lowest pathloss between the infrastructure node and user node, and, thus, do not generally suffer from severe interference from other links of the same deployment. When these conditions above are not met, the third tier nodes of with the same deployment ID may be assigned different "virtual deployment IDs", in which case they will use different, uncorrelated random number generators.

The second step that affects maximal spatial reuse is for different third tier nodes of a particular third tier deployment to start their CCA at the same time. This can be ensured by defining regularly spaced time-instants or preferred start times where third tier nodes of a deployment are to start a new extended CCA process. Third tier nodes with ongoing packet transmissions may terminate their transmissions shortly before an upcoming time-instant of the preferred start times, so that the node may synchronize with other third tier nodes of its deployment.

At block 704, the third tier node waits for n slots (1 slot~20 usec), and then, at block 705, performs a CCA check. A determination is made, at block 706, whether the third tier node detects a clear CCA. If so, then, at block 707, the third tier node transmits the data on the channel. However, if, after the determination at block 706, the third tier node does not detect a clear CCA, then the process is repeated, starting at block 702 until a clear CCA is detected.

If the determination at block 701 indicates that the third tier node has not accessed the channel within the maximum idle time, then, at block 708, the third tier node may immediately perform a CCA check, at block 708. A determination is made, at block 709, whether the CCA check from block 708 is clear. If so, then, at block 707, the third tier node transmits the data on the channel. However, as with the determination made at block 706, if the CCA check is not clear, then, the process repeats from block 708.

Upon detecting a successful CCA, either as a part of the direct CCA or the extended CCA process, the third tier node may transmit on the channel for at a predetermined maximum transmit time. The predetermined maximum transmit time allows the third tier node an opportunity to recheck for a second tier beacon or perform additional CCA checks. After relinquishing the channel, the third tier node may either perform the extended CCA process or wait for the predetermined maximum idle time in order to perform a simple CCA check before transmitting again.

It should be noted that the aspects of the present disclosure addressing the horizontal sharing between third tier users by performing either a simple CCA or triggering the extended CCA process are subject to the silence period intended for the third tier nodes to listen for the second tier beacon as a part of the vertical sharing aspects. When each third tier node enters the silent period, the particular horizontal sharing state (e.g., transmission ACTIVE/IDLE/WAIT) is preserved during the silence period.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a third tier node, whether the third tier node has accessed a channel of a shared spectrum within a predetermined maximum idle time;
   randomly selecting, by the third tier node, a wait number from a predefined set of wait numbers in response to the third tier node detecting access to the channel within the predetermined maximum idle time;
   conducting, by the third tier node, a clear channel assessment (CCA) check of the channel after waiting a number of slots equal to the randomly selected wait number; and
   transmitting, by the third tier node, data on the channel in response to the CCA check being clear.

2. The method of claim 1, further including:
conducting, by the third tier node, an idle CCA check of the channel in response to the third tier node failing to detect access to the channel within the predetermined maximum idle time; and
transmitting, by the third tier node, the data on the channel in response to the idle CCA check being clear.

3. The method of claim 2, wherein the transmitting the data on the channel in response to the CCA check or the idle CCA check being clear is limited to a predefined maximum transmit time.

4. The method of claim 1, wherein the randomly selecting includes:
randomly selecting the wait number using a random number generator assigned to each of at least one or more third tier nodes in a same third tier deployment as the third tier node, wherein the random number generator is keyed by a start time of the CCA check.

5. The method of claim 1, wherein the randomly selecting includes:
randomly selecting the wait number using a random number generator that is uncorrelated with other random number generators assigned to other third tier nodes in a different third tier deployment as the third tier node.

6. The method of claim 1, further including:
obtaining, by the third tier transmitter, synchronization timing, wherein the synchronization timing synchronizes the third tier transmitter to a second tier infrastructure;
switching, by the third tier transmitter, to a transmitter silence mode during a beacon slot on the shared spectrum, wherein the third tier transmitter determines the beacon slot using the synchronization timing;
in response to detecting a second tier beacon during the beacon slot, ceasing, by the third tier transmitter within a predefined period, transmission of the data on the channel.

7. An apparatus configured for wireless communication, comprising:
means for determining, by a third tier node, whether the third tier node has accessed a channel of a shared spectrum within a predetermined maximum idle time;
means for randomly selecting, by the third tier node, a wait number from a predefined set of wait numbers in response to the third tier node detecting access to the channel within the predetermined maximum idle time;
means for conducting, by the third tier node, a clear channel assessment (CCA) check of the channel after waiting a number of slots equal to the randomly selected wait number; and
means for transmitting, by the third tier node, data on the channel in response to the CCA check being clear.

8. The apparatus of claim 7, further including:
means for conducting, by the third tier node, an idle CCA check of the channel in response to the third tier node failing to detect access to the channel within the predetermined maximum idle time; and
means for transmitting, by the third tier node, the data on the channel in response to the idle CCA check being clear.

9. The apparatus of claim 8, wherein the means for transmitting the data on the channel in response to the CCA check or the idle CCA check being clear is limited to a predefined maximum transmit time.

10. The apparatus of claim 7, wherein the means for randomly selecting includes:

means for randomly selecting the wait number using a random number generator assigned to each of at least one or more third tier nodes in a same third tier deployment as the third tier node, wherein the random number generator is keyed by a start time of the CCA check.

11. The apparatus of claim 7, wherein the means for randomly selecting includes:
means for randomly selecting the wait number using a random number generator that is uncorrelated with other random number generators assigned to other third tier nodes in a different third tier deployment as the third tier node.

12. The apparatus of claim 7, further including:
means for obtaining, by the third tier transmitter, synchronization timing, wherein the synchronization timing synchronizes the third tier transmitter to a second tier infrastructure;
means for switching, by the third tier transmitter, to a transmitter silence mode during a beacon slot on the shared spectrum, wherein the third tier transmitter determines the beacon slot using the synchronization timing;
means, executable in response to detecting a second tier beacon during the beacon slot, for ceasing, by the third tier transmitter within a predefined period, transmission of the data on the channel.

13. A non-transitory computer-readable medium having program code recorded thereon, the program code comprising:
program code for causing the computer to determine, by a third tier node, whether the third tier node has accessed a channel of a shared spectrum within a predetermined maximum idle time;
program code for causing the computer to randomly select, by the third tier node, a wait number from a predefined set of wait numbers in response to the third tier node detecting access to the channel within the predetermined maximum idle time;
program code for causing the computer to conduct, by the third tier node, a clear channel assessment (CCA) check of the channel after waiting a number of slots equal to the randomly selected wait number; and
program code for causing the computer to transmit, by the third tier node, data on the channel in response to the CCA check being clear.

14. The non-transitory computer-readable medium of claim 13, further including:
program code for causing the computer to conduct, by the third tier node, an idle CCA check of the channel in response to the third tier node failing to detect access to the channel within the predetermined maximum idle time; and
program code for causing the computer to transmit, by the third tier node, the data on the channel in response to the idle CCA check being clear.

15. The non-transitory computer-readable medium of claim 14, wherein the program code for causing the computer to transmit the data on the channel in response to the CCA check or the idle CCA check being clear is limited to a predefined maximum transmit time.

16. The non-transitory computer-readable medium of claim 13, wherein the program code for causing the computer to randomly select includes:
program code for causing the computer to randomly select the wait number using a random number generator assigned to each of at least one or more third tier nodes in a same third tier deployment as the third tier node, wherein the random number generator is keyed by a start time of the CCA check.

17. The non-transitory computer-readable medium of claim 13, wherein the program code for causing the computer to randomly select includes:
program code for causing the computer to randomly select the wait number using a random number generator that is uncorrelated with other random number generators assigned to other third tier nodes in a different third tier deployment as the third tier node.

18. The non-transitory computer-readable medium of claim 13, further including:
program code for causing the computer to obtain, by the third tier transmitter, synchronization timing, wherein the synchronization timing synchronizes the third tier transmitter to a second tier infrastructure;
program code for causing the computer to switch, by the third tier transmitter, to a transmitter silence mode during a beacon slot on the shared spectrum, wherein the third tier transmitter determines the beacon slot using the synchronization timing;
program code for causing the computer to cease, in response to detecting a second tier beacon during the beacon slot, by the third tier transmitter within a predefined period, transmission of the data on the channel.

19. An apparatus configured for wireless communication, the apparatus comprising:
at least one processor; and
a memory coupled to the at least one processor,
wherein the at least one processor is configured:
to determine, by a third tier node, whether the third tier node has accessed a channel of a shared spectrum within a predetermined maximum idle time;
to randomly select, by the third tier node, a wait number from a predefined set of wait numbers in response to the third tier node detecting access to the channel within the predetermined maximum idle time;
to conduct, by the third tier node, a clear channel assessment (CCA) check of the channel after waiting a number of slots equal to the randomly selected wait number; and
to transmit, by the third tier node, data on the channel in response to the CCA check being clear.

20. The apparatus of claim 19, further including configuration of the at least one processor:
to conduct, by the third tier node, an idle CCA check of the channel in response to the third tier node failing to detect access to the channel within the predetermined maximum idle time; and
to transmit, by the third tier node, the data on the channel in response to the idle CCA check being clear.

21. The apparatus of claim 20, wherein the configuration of the at least one processor to transmit the data on the channel in response to the CCA check or the idle CCA check being clear is limited to a predefined maximum transmit time.

22. The apparatus of claim 19, wherein the configuration of the at least one processor to randomly select includes configuration to randomly select the wait number using a random number generator assigned to each of at least one or more third tier nodes in a same third tier deployment as the third tier node, wherein the random number generator is keyed by a start time of the CCA check.

23. The apparatus of claim 19, wherein the configuration of the at least one processor to randomly select includes configuration to randomly select the wait number using a random number generator that is uncorrelated with other random number generators assigned to other third tier nodes in a different third tier deployment as the third tier node.

24. The apparatus of claim 19, further including configuration of the at least one processor:
to obtain, by the third tier transmitter, synchronization timing, wherein the synchronization timing synchronizes the third tier transmitter to a second tier infrastructure;
to switch, by the third tier transmitter, to a transmitter silence mode during a beacon slot on the shared spectrum, wherein the third tier transmitter determines the beacon slot using the synchronization timing;
to cease, in response to detecting a second tier beacon during the beacon slot, by the third tier transmitter within a predefined period, transmission of the data on the channel.

* * * * *